United States Patent [19]

Wada et al.

[11] 4,439,492

[45] Mar. 27, 1984

[54] INJECTION MOLDED ARTICLES WITH IMPROVED SURFACE CHARACTERISTICS

[75] Inventors: Akihiro Wada, Inagi; Kichiya Tazaki, Yokohama; Tamotsu Tahara, Omiya; Hiroshi Suzuki, Tokyo; Yukihisa Mizutani, Kawasaki, all of Japan

[73] Assignee: Asahi-Dow Limited, Tokyo, Japan

[21] Appl. No.: 363,025

[22] Filed: Mar. 29, 1982

Related U.S. Application Data

[62] Division of Ser. No. 177,184, Aug. 11, 1980, Pat. No. 4,340,551.

[51] Int. Cl.$^3$ .......................... B32B 9/00; B32B 9/04
[52] U.S. Cl. ................................ 428/409; 428/542.8; 428/912.2; 264/25
[58] Field of Search ...................... 428/542.8, 409, 212, 428/912.2; 264/25

[56] References Cited

U.S. PATENT DOCUMENTS

| | | |
|---|---|---|
| 2,686,935 | 8/1954 | Stott . |
| 2,696,023 | 12/1954 | Stott . |
| 2,781,547 | 2/1957 | Moxness . |
| 3,988,403 | 10/1976 | Angell et al. . |
| 4,029,841 | 6/1977 | Schmidt . |
| 4,064,206 | 12/1977 | Seufert . |
| 4,083,901 | 4/1978 | Schonfeld et al. .................. 265/25 |
| 4,123,488 | 10/1978 | Lawson . |
| 4,198,457 | 4/1980 | Saito et al. ........................ 428/409 |
| 4,201,742 | 5/1980 | Hendry . |

FOREIGN PATENT DOCUMENTS 796504 6/1958 United Kingdom .
940903 12/1963 United Kingdom .

*Primary Examiner*—Marion McCamish
*Assistant Examiner*—Beverly K. Johnson
*Attorney, Agent, or Firm*—Armstrong, Nikaido, Marmelstein & Kubovcik

[57] ABSTRACT

In injection molding thermoplastic resin compositions containing reinforcing materials and/or fillers, high quality molded articles superior in surface gloss and exhibiting substantially no surface defect can be obtained, by employing a technical measure, in which only superficial layer of the inner wall surface of the mold is selectively heated, by high-frequency induction heating, to a temperature above the heat distortion temperature of the thermoplastic resin composition employed prior to injection molding and cooling and solidifying the resin.

6 Claims, 12 Drawing Figures

INJECTION MOLDED ARTICLES WITH IMPROVED SURFACE CHARACTERISTICS

This is a continuation of application Ser. No. 177,184, filed Aug. 11, 1980, U.S. Pat. No. 4,340,551.

FIELD OF THE INVENTION

The present invention relates to a method article whose surface highly copies a metal mold surface. Also, it relates to a molded article having high uniformity in the surface thereof, particularly even gloss and even appearance, i.e., having little silver streak, jetting and weld line thereon.

DESCRIPTION OF THE PRIOR ART

Heretofore, injection molding of thermoplastic resin has, in general, been based on a technique, in which a resin mixture is molded in a metal mold by utilizing the plasticity of the thermoplastic resin, that is to say, by rendering the thermoplastic resin followable by heating it in, such as, screw, etc., and is then solidified in the mold by cooling it to obtain the molded article. Thus, it is necessary to cool the molded resin mixture to a temperature below the heat distortion temperature of the resin employed, in order to attain solidification of the resin mixture, so as to release and remove the molded article from the mold in a satisfactory manner. For this reason, the temperature of the metal mold is held usually below the heat distortion temperature of the resin employed. Also it has currently been practiced to cool the metal mold to a temperature closely above the dew point by using a refrigerant, in order to increase the productivity. Even when, in cooling the metal mold, the sensible heat of the molten resin is used for, such as, heating and regenerating, the temperature of the metal mold in accordance with the principle of the technique, should be kept below the heat distortion temperature of the thermoplastic resin. The molten thermoplastic resin mixture, upon contact with the cold surface of the metal mold, is cooled abruptly and loses its flowability sharply near the surface of the mold, whereby the fitness onto the mold surface is greatly impaired to result in a considerable irregularity on the surface of the molded article.

When reinforcing materials and/or fillers are employed, with compatibility of the reinforcing substances and/or of fillers with the thermoplastic resin being, in general, low, micronous interspace over the interface between the particle surface of the reinforcing materials and the thermoplastic resin may be formed, causing so-called silver streak to appear on injection molded articles. Thus, only molded articles of poor appearance with silver streaks, surface irregularity due to exposure of the reinforcing materials and/or fillers on the outer face, can be obtained.

As explained above, in producing molded articles from thermoplastic resin compositions, especially those containing reinforcing materials and/or fillers by injection molding, it is important to prevent solidification of the molten composition by cooling while it is flowing within the mold cavity.

As a measure for preventing such peripheral solidification of the resin mixture, it has been proposed to elevate the temperature of the metal mold. However, an increase of the temperature of metal mold will naturally require a longer cooling time, and this will result in molded article being taken out of the mold, while still incompletely solidified and thus exhibiting poor dimensional stability. Therefore, in actual practice, the temperature of the metal mold is adjusted at a temperature compromising the adverse effects of these contradictory conditions.

Explaining one typical example of the conventional art, there is proposed in Japanese published examined patent application No. 22,020/1970, a technical measure, in which the inner surfaces of the metal mold are pre-heated superficially by introducing a high temperature fluid into the mold cavity prior to the injection of molten resin mixture thereinto. This method however, brings forth difficulties in that, since the fluid is heated after it is in the mold, the residual fluid may cause various streaks and spoil over the surface of the molded articles. And, since in some cases, heated fluid is introduced into the mold, inhomogenerous heating of the mold inner surface may occur at portions where the mold cavity exhibits a projection or a recess, such as, cause for a rib or a stub resulting sink marks, irregular gloss and so on of the molded articles. In extreme cases, the resin may even adhere to the mold surface making it difficult to remove therefrom. This can even result in the molded article to be broken at time of removal and thus molded articles of satisfactory appearance cannot be expected.

The surface gloss is a very important feature that determines the marketability of the injection molded article. The surface gloss corresponds to a reproductivity of the smooth surface of the metal mold, which in identical molding conditions depends on the degree of finish of the mold inner surface. Thus, surface gloss is best, when a mold having perfect mirror surface is used. However, this resulting best surface gloss depends, on the other hand, upon the composition of the resin mixture. In general, this surface gloss decreases with increase of the content of additives such as reinforcing materials and/or fillers. In particular, an injection molded article of a resin composition containing additives in an amount adequate to impart sufficient reinforcement or filling effect will exhibit under ordinary conditions of injection molding poor gloss which is considerably inferior than that of the molded article of resins having no additives.

Glass fiber-reinforced thermoplastic resin is a useful molding material having performances nearer to those of metals, because the resin has a high rigidity, a low coefficient of linear expansion, an improved heat resistance and a dimensional stability superior to that of conventional thermoplastics. However, its application is almost limited to inner structural parts, for example, chassis of a tape recorder, because many glass fibers project and silver streaks appear on the surface of the articles. An additional processing, for example, coating, is necessary to cover the difficulties above, and this processing requires an extreme amount of labor because of the roughness of the surface.

Also, molded articles made of high impact polystyrene and the like have a nonuniform gloss, flow mark, weld line, etc. Accordingly, when a beautiful appearance is required, for instance, in the case of high quality articles such as a housing of radio, a front frame of television and a housing of an air conditioning apparatus, processing such as coating or hot stamping is necessary. However, any of these processing requires an extreme amount of labor resulting in high cost.

The present inventors desired to obtain molded articles having frew defects in appearance without any after-treatment.

SUMMARY OF THE INVENTION

One object of the present invention is therefore to provide injection molded articles of thermoplastic resin compositions containing reinforcing materials and/or fillers, said molded articles exhibiting surface gloss comparable to those of injection molded resin articles without additives and which exhibit no surface defect such as silver streak etc.

Another object of the present invention is to provide an improved method of injection molding which permits the manufacture of injection molded articles exhibiting superior surface characteristics mentioned above from thermoplastic resin compositions containing reinforcing materials and/or fillers, in a shorter molding cycle.

According to the present invention, there are provided injection molded articles of thermoplastic resin compositions containing reinforcing materials and/or fillers in an amount at least 4% by weight, comprising smooth skin layer constituted substantially of only the resin component over the outer surface of the molded article, said layer bestowing on the article a mirror surface having surface gloss (ASTM D 523; 60°) well maintained within a decrement of reflectivity of 10% or less, preferably below 5%, and more preferably 3% or less, based on the perfect mirror reflection of the individual resin.

The injection molded articles according to the present invention can be produced by a method of injection molding thermoplastic resin compositions containing at least 4% by weight of reinforcing materials and/or fillers, comprising, selectively pre-heating by a high-frequency induction heating, the inner surface of the metal mold superficially to a temperature above the heat distortion temperature of the resin employed, before the injection of the molten resin mixture into the mold, so as to permit sufficient flow of the molten resin mixture in contact with the inner surface of the metal mold to form a smooth skin layer with a thickness of preferably 1–100μ consisting substantially of only the resin component.

The present invention provides further an injection molding apparatus to be adopted suitably for performing the above mentioned method of injection molding of thermoplastic resin mixture, said apparatus consisting of (a) an injection arrangement having means for melting, metering and injecting the resin mixture and (b) a metal mold provided with means for cooling and solidifying the molded resin mixture, comprising (c) a high-frequency oscillator and (d) a high-frequency induction heating device constituted of an inductor which is connected to said oscillator and is disposed in the neighborhood of said metal mold so as to enable to heat the inner surface of the metal mold only superficially.

The characteristic feature of the present invention resides in that the inner surface of the metal mold is selectively heated only superficially to a temperature above the heat distortion temperature of the resin using a high-frequency induction heating, whereby a smooth mirror surface with increased gloss is brought about on the molded resin article. The heat distortion temperature herein used corresponds to that prescribed by ASTM D 648 (18.6 Kg/cm² Fiber Stress). By the words "selectively heat the surface superficially", it is meant, that the inner surface of the metal mold is heated instantaneously only to a depth of a skin layer using high-frequency induction heating.

Such instantaneous heating can only be achieved by a special heating method of high-frequency induction heating. It is essential for attaining the objects of the present invention, that the temperature in the skin layer of the mold inner surface is elevated at a fast rate. The actual rate of heat elevation is determined by taking into account of the actual heat distortion temperature of the resin employed, size of the molded product, the mold releasing temperature which is determined suitably in accordance with the foregoing factors, and so on for each resin. It is recommended, however, to heat to a predetermined temperature at a heat elevation rate of 80° C. per minute or more, preferably 480° C./min. or higher and most preferably at least 1200° C./min. By employing such instantaneous heating, only a thin layer over the inner surface of the metal mold can be heated above the heat distortion temperature of the resin without the heat being conducted into the interior of the mold metal and without causing the whole metal mold to be heated, so as to accomodate to the prompt heat removal at time of cooling. Thus, it is possible to shorten the molding cycle with simultaneous attainment of higher surface quality of the molded articles. Furthermore, by employing the high-frequency induction heating, such things that may cause to contaminate the metal mold as the heating fluid mentioned previously is completely excluded, thus eliminating the possible deterioration of the molded product. Other advantages of the use of high-frequency induction heating may be recited as follows:

(a) facilitated temperature control, (b) enabling either homogeneous heating over the whole surface of the mold or selective heating including local heating of specific area beside the above mentioned superficial heating, thus enabling voluntarily to heat either of the whole mold or of local part of the mold, (c) eliminating adverse effects of heat on the operators (d) offers a push-button automatic operation.

The invention is further explained below with reference to the drawings appended, so as to facilitate the understanding of the principle of the present invention.

DETAILED DESCRIPTION OF THE INVENTION

Figure 1:
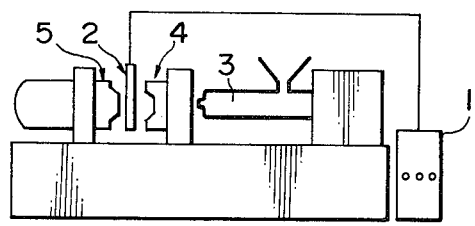
FIG. 1 shows an embodiment of the apparatus to be employed for performing the method of injection molding according to the present invention in schematic illustration.
Figure 2:
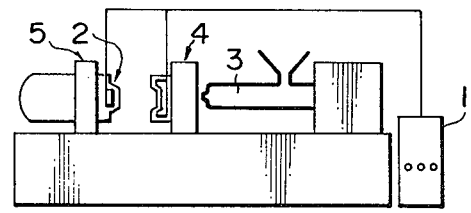
FIG. 2 is another embodiment comparable to FIG. 1.

As shown in FIGS. 1 and 2, the apparatus according to the present invention consists of an injection molding machine and a high-frequency induction heating device. The high frequency induction heating device is composed of a high-frequency oscillator 1 and an inductance coil (inductor) 2 installed near the inner surface of the metal mold and connected to the oscillator 1. The injection molding machine is composed of an injection cylinder segment 3 for realizing the melting and injecting of the resin mixture and a mold segment consisting of a stationary split mold half 4 and a movable split mold half 5. In the embodiment shown in FIGS. 1 and 3, the inductor is inserted in the mold cavity by being pinched between the two mold halves of the split metal mold. In the embodiment shown in FIGS. 2 and 4, the inductor 2 is built in internally of the mold.

Figure 3:
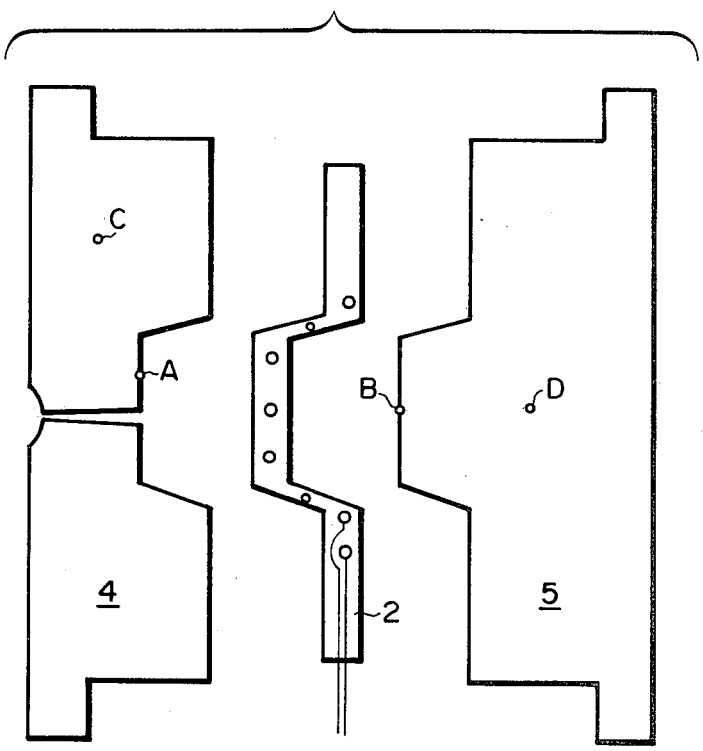
FIG. 3 shows only the portion of metal mold employing a high-frequency inductor pendingly inserted within the mold cavity, in vertical section.
Figure 5:
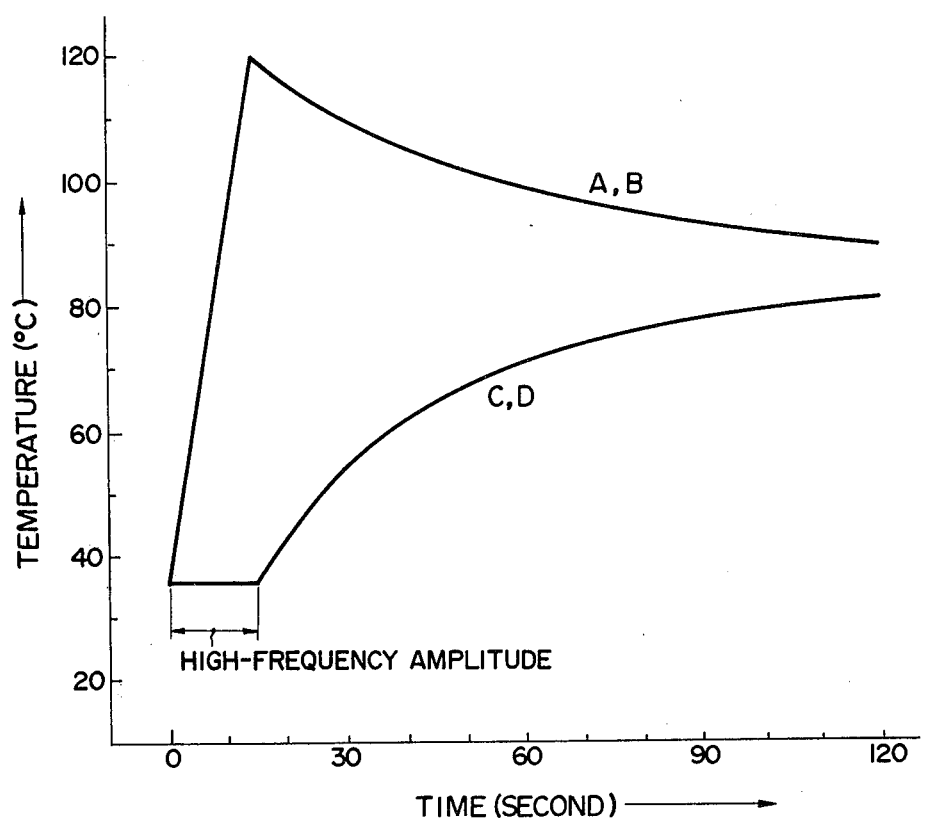
FIG. 5 is a graph showing a typical temperature distribution within the mold.

In FIG. 3, the mold segment and the inductor of FIG. 1 are shown in an enlarged view. The inductor 2 for the high-frequency induction heating is placed between the stationary mold half 4 and the moving mold half 5. When it is energized by a high frequency oscillation, it can be recognized that only the temperature in the surface layer of the metal mold (at points A and B) is increased steeply and the temperature in the bulk of the mold (at points C and D) is kept almost unchanged, as shown in FIG. 5. The temperature-time diagram shown in FIG. 5 illustrates exemplarily the course of temperature changes at various portions of the metal mold after high-frequency induction heating without employing water-cooling of the mold. The split metal mold is once opened, when the temperature of the mold surface has reached a predetermined temperature. The inductor 2 is withdrawn from the space between the fixed mold half 4 and the movable mold half 5. Subsequently, the split mold is closed again to carry out the injection molding of thermoplastic resin mixture in a conventional manner.

Figure 4:
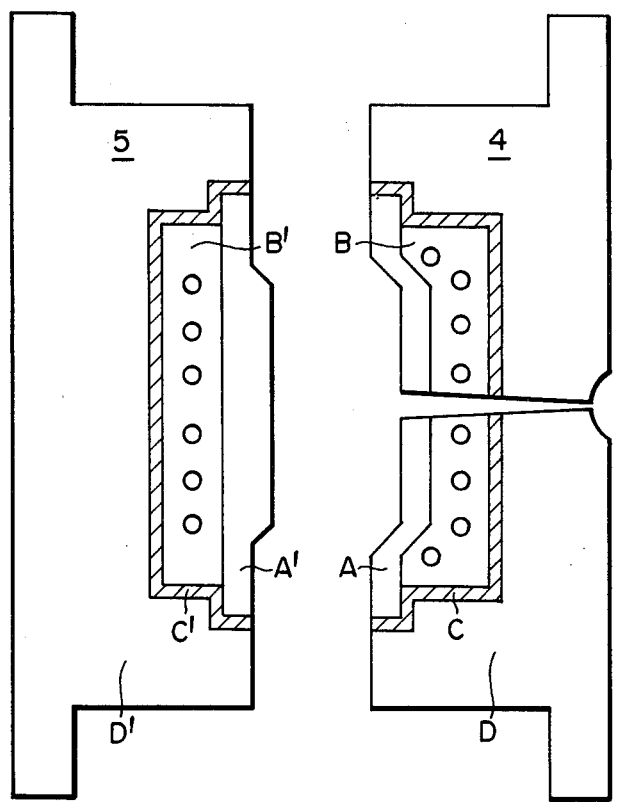
FIG. 4 shows another embodiment of inductor of built-in type also in vertical section.

FIG. 4 shows another performance form of the apparatus according to the present invention in which the inductor is arranged in the metal mold as a built-in installation. The mold shown is a two-sectioned center-direct gate type split mold for manufacturing dish-like article having a diameter of about 10 cm. The portions A and A' constitute the mold cavity (that determines the shape and appearance of the molded article) and are made of the usual mold metal, SC metal such as S-45C, S-55C etc., plate metal thereof, ultra hard mold metal (alloyed tool steel) or a mold steel such as NAK, SKD 11 or the like. The symbols B and B' denote the inductor for high-frequency induction heating. The inductor is prepared in such a manner, that a copper tube is wound into spiral and is consolidated by embedding in a hardened resin such as epoxy etc.

C and C' indicate insulation layers for high-frequency wave made from a non-magnetic metal, as will be explained afterwards in detail. D and D' represent the matrix, in which other functional mechanisms requisite for injection molding are embedded. This matrix is furnished with, such as, guide pin, flange and holes for fixing the metal mold, studs and so on. For the material of the matrix, any mold metal can be employed. An ordinary steel, for example, an SC steel, such as S-45C or S-55C may be recommended for its durability. The cooling water may be circulated through perforations arranged either in the matrix or, in order to upgrade efficiency, in the portions A and A'.

It may be possible in accordance with the configuration of the molded article, to unite or intergrate the portions C, C' with D, D' so as to use only one and the same material, for example, Be-Cu or so on.

In case the inductor is merely embedded in the mold metals, portions of mold metal close to the inductor will be heated, and thus, causing the interior of the mold metal to be heated. Due to such useless heating inside the mold metal, the oscillator tends to be subject to overload, which may cause an actuation of the overload breaker, resulting in a cessation of also the necessary superficial heating.

Sometimes, a mold cannot be closed tightly and molding cannot be effected when a part of the mold, for example, guide pins, is overheated unevenly, because there is no insulation layer.

The inventors having taken notice of the fact that there is a selectivity among materials in their susceptibility to high-frequency induction heating, studied various materials and found it best to use non-magnetic metals. In consequence of the study, it was found that successful results were obtainable, when the portion of the metal mold exposed to the molten resin mixture and to be heated is constituted of a material subject to the high-frequency induction heating, such as a ferrous metal containing predominant amount of iron such as steel, for example, S-45C, S-55C, NAK or so on, and the portion of the metal mold requiring no heating is constituted of a non-magnetic metal.

Here, in general, non-magnetic matals other than Be-Cu alloy are soft and are not suited well for the matrix metal with regard to their durability.

The inventors had therefore made their efforts to direct to overcome such circumstances and have found, that the portion of the metal mold where no heating is required can be isolated from the high-frequency wave, when a thin layer of a non-magnetic metal is interposed between the inductor and said metal mold portion.

A thickness of this non-magnetic metal layer of 0.5 mm or more will offer a sufficient insulation for the purpose of the present invention, whereas a thickness below 0.5 mm may bring forth faulty result. For instance, an aluminum foil of 0.1 mm thickness will fuse down upon the high-frequency induction heating and will not build up an insulating layer.

Thus, an injection molding process and apparatus thereof comprising a metal mold equipped with embedded inductor for heating selectivity the superficial layer of the mold inner surface contacting the injected resin mixture according to the present invention, in which an insulating layer against the high-frequency wave is interposed between the inductor and the portion of the metal mold requiring no heating, and which enables steep heating and cooling utilizing high frequency induction heating, is most effective.

The non-magnetic metal to be used according to the present invention includes Cu, Al, Be and alloys consisting predominantly of these metals inclusive of bronze, beryllium copper and so on. Ceramics, glass, wood and the like are also non-magnetic substances, but these are not suitable for use as material for molds for their inferior heat conductance, durability and so on.

The injection molded articles according to the present invention acquires from the superficially heated inner surface of the metal mold a corresponding reproductive surface with excellent surface gloss. The gloss is well kept within a range in which the decrement of reflectivity from the ideal perfect mirror reflection is at the most 10%, based on the perfect mirror reflection of the employed resin itself.

Here, by the perfect mirror reflection of the resin is meant an intrinsic measure of gloss determined in relation to the index of refraction of each individual resin employed, which corresponds to a percentage indication of the reflectivity measured at a prescribed standard angle of incidence (60° in the specification of the present invention) relative to the reflectivity of smooth surface of a glass having an index of refraction of 1.567, measured at the same standard angle of incidence, as is instructed by JIS Z 8741. The perfect mirror reflection for each index of refraction of resin can be seen from the following table:

| Index of Refraction of Resin | Gloss at Angle of Incidence of 60° for Perfect Mirror Reflection of Resin in % (Gs 60°)% |
|---|---|
| 1.500 | 89.1 |
| 1.520 | 92.4 |
| 1.540 | 95.7 |
| 1.560 | 98.9 |
| 1.580 | 102.1 |
| 1.600 | 105.1 |

A perfect mirror reflection of any voluntary resin can be estimated from the above table by interpolating from the given values. For instance, in a so-called high impact polystyrene (HIPS) reinforced by 5–20% by weight of a rubber (e.g. polybutadiene), the "individual resin employed" here is polystyrene. Index of refraction n of a polystyrene lies in general at about 1.592 and the perfect mirror reflection is calculated to be 104.6. A high impact polystyrene molded article obtained according to the present invention exhibits therefore a surface gloss value (Gs 60°)%) of from about 94.6% (decrement of 10%) to about 104.6%.

In another example of resin of an ABS copolymer with monomer ratio acrylonitrile/styrene of 30/70 and containing about 5 to 35% by weight of butadiene, the individual resin employed is the acrylonitrile/styrene copolymer with monomer ratio 30/70. Here, the index of refraction n equals to 1.577 and the perfect mirror reflection calculates to 101.6%. For the case where the acrylonitrile/styrene ratio corresponds to 25/75, the refractive index n equals to 1.579, corresponding to a perfect mirror reflection value of 101.9%. Thus, if ABS resins exhibiting A/S ratios of 30/70 and 25/75 are employed, the surface gloss values (Gs (60°)%) of the injection molded articles obtained fall within the range of from 91.6 to 101.6% and from 91.9 to 101.9% respectively. Likewise, injection molded articles of polyphenyleneether (PPE) resins according to the present invention show surface gloss values (Gs 60°) in a range from about 80 to 108%, especially from 90 to 108%, depending also on the individual PPE used.

Figure 6:
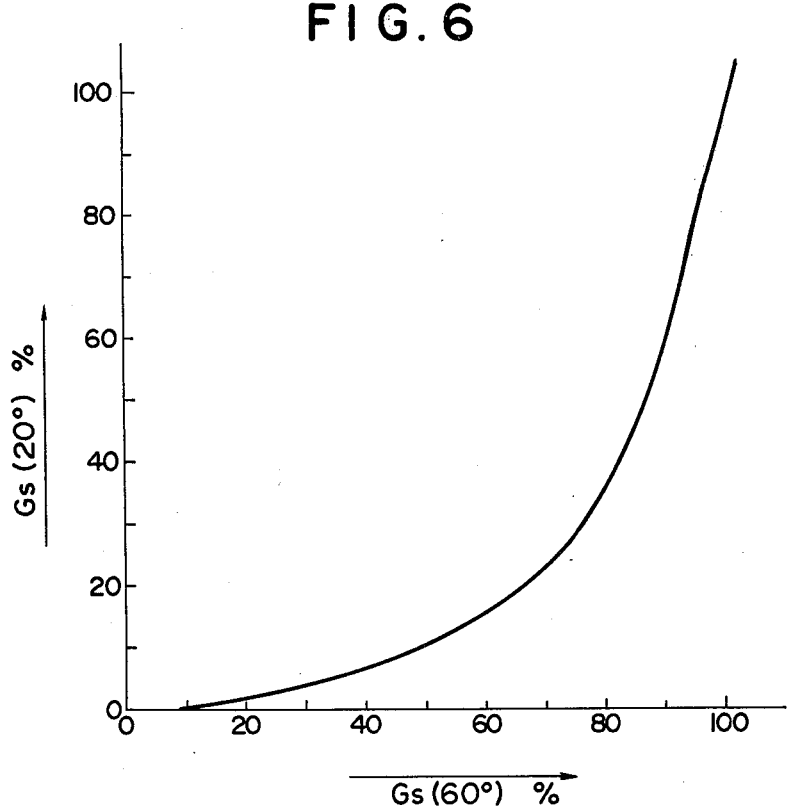
FIG. 6 illustrates the correlation between the gloss (20°) in % and the gloss (60°) in % for molded articles according to the present invention.

In this specification, the evaluation of the surface gloss of molded article is based on the value of Gs(60°)% of ASTM D 523, in accordance with the current practice for evaluating molded articles of plastic materials for their appearance and glaze, wherein a % indication of gloss at insident angle of 60° is employed for the evaluation. Following strictly the instruction of ASTM D 523, it is prescribed to employ a Gs(20°)% value measured at an incident angle of 20° for estimating the gloss, when the Gs(60°)% value exceeds 70%. In this regard, measurements were performed for estimating Gs(60°)% and Gs(20°)% values on molded articles according to the present invention, in order to clear the correlation between them. The results are shown in FIG. 6. If the instruction of ASTM D 523 is followed exactly, the gloss of a molded article showing Gs(60°)% value greater than 70% must be expressed by the corresponding Gs(20°)% value obtainable from FIG. 6. In this specification however, the evaluation is performed exclusively by Gs(60°)% value, following the conventional practice in the art since the difference in relation to the Gs(20°)% is apparent.

Injection molded articles according to the present invention exhibit the surface gloss intrinsic of the employed thermoplastic resin itself and show no noticeably faulty appearance, such as, so-called flow mark, jetting, weld line and silver streak, caused from the irregular flow of the thermoplastic resin mixture containing reinforcing material and/or filler. In the injection molded articles according to the present invention, it is preferable even for articles of complicated configurations, such as lattice and the like, not to mention articles of simpler shapes, to have the said thermoplastic resin skin-layer of thickness 1–100μ. The excellent surface gloss may be attributed to the fact that the molten resin mixture injected into the mold cavity is permitted to keep its flow even on the surface of the metal mold, due to the preliminarily conducted superficial heating of the metal mold, so that a smooth skin layer constituted substantially of only the resin component without reinforcing material or filler may be formed over the inner surface of the metal mold under the filling up of dents and pits due to the reinforcing material or filler.

Figure 8:
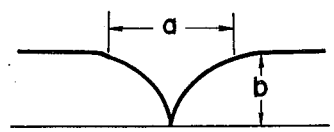
FIG. 8 is an explanatory illustration of weld line on the molded product in lateral section.
Figure 9:
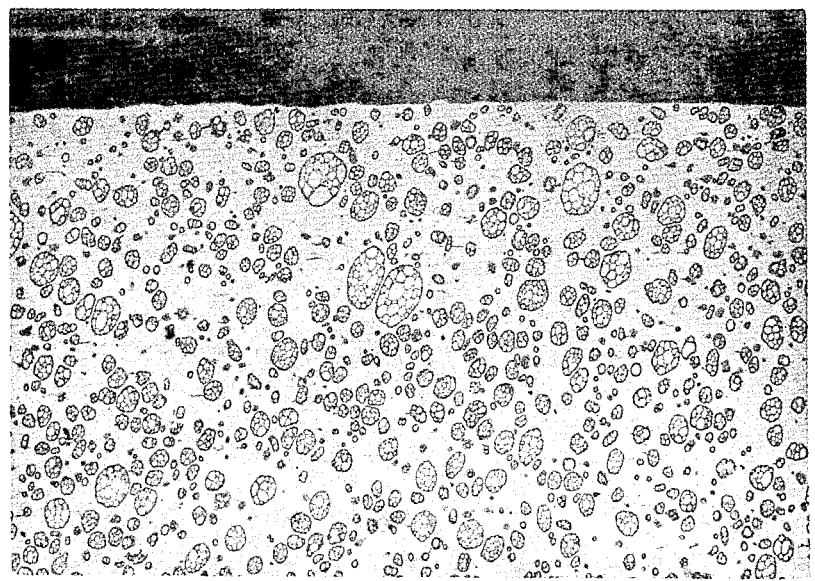
FIG. 9 is a microphotograph (×7000) of a cross section of a shaped article employing high impact polystyrene according to the present process.
Figure 10:
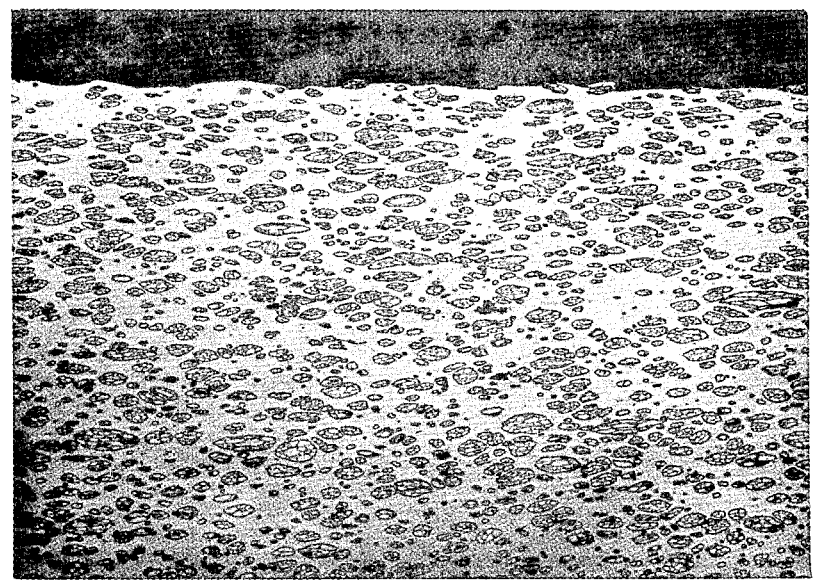
FIG. 10 is a microphotograph of the similar article to FIG. 9, according to conventional process.
Figure 11:
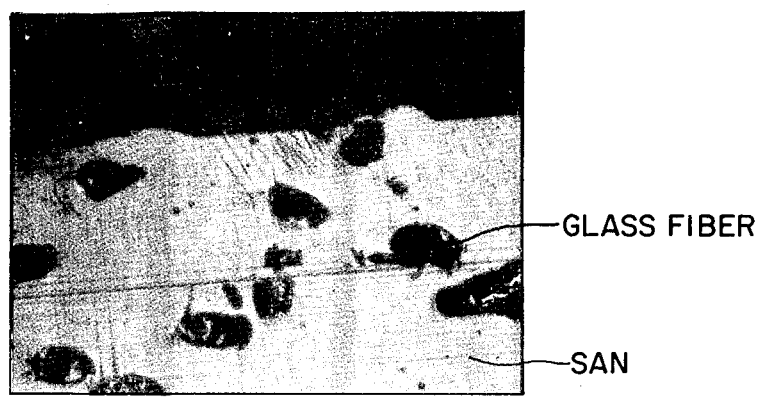
FIG. 11 is a microphotograph (×440) of a cross-section of a shaped article employing glass fiber reinforced styrene-acrylonitrile resin (herein referred to "SAN-GF") according to the present process.
Figure 12:
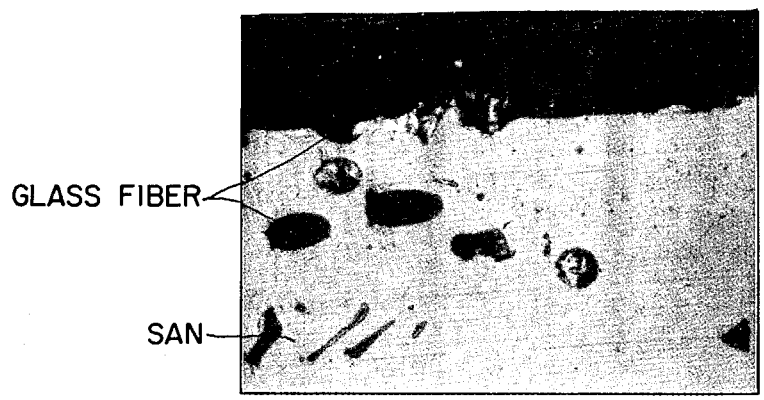
FIG. 12 is a microphotograph of the similar article to FIG. 11, according to conventional process.

In a usual injection molding, weld line appears at the junction of flow of the molten resin mixture inside the mold as a conflux line in a form of thin groove having a depth of 3–5μ or more and a width of over 10μ, as shown in FIG. 8, in a lateral section. In injection molded articles according to the present invention, substantially no noticeable weld line indention having depth less than 1μ and width less than 5μ occurs.

Flow mark can be formed by, for example, a disturbance of flow of the molten resin mixture and an irregularity in pressure transmission at a portion of varying wall thickness of the molded article, due to cooling and solidification of the molten resin mixture on the metal mold. Injection molded articles according to the present invention shows no such flow mark.

Silver streak appears on the surface of molded articles upon the solidification of the resin mixture in a form of streak of silver color while volatile materials etc. in the resin mixture are being volatilized. In injection molded articles according to the present invention, no silver streak can be found.

Jetting occurs often at the gate of the mold as a trace of partially projecting line in the mold due to the acceleration of the flow of resin mixture through a narrow throat. This is also excluded in molded articles according to the invention.

All the deteriorations in the appearance mentioned above are based on the irregularity in the flow of molten resin mixture inside the metal mold, and hence, are avoided in the molded articles according to the present invention by the improvement of the flow of resin mixture on the mold surface.

According to the present invention, there occurs no solidification of the resin mixture by cooling upon entrance thereof into the metal mold and a uniform flow of the molten resin mixture over the whole inner surface of the metal mold can be warranted, since the inner surface of the metal mold has been heated preliminarily above the heat distortion temperature of the resin. This results in a uniform surface gloss with substantially the same gloss regardless of the portion of the mold, say the gate end or the dead end thereof.

Although the reason is not clear, an article having no defect in appearance on the surface thereof can be molded of a uniform flow effect and, in addition, with the disappearance of the defects in appearance, or probably by both of them; because the resin which contacts the surface of the metal mold has not yet solidified, and therefore, the resin is transformed and allowed to closely contact the surface of the metal mold when the metal mold is completely filled with resin having an injection pressure imposed on it. This results in the disappearance of the defects such as silver streak, flow mark and jetting. Furthermore, even though these defects may initially appear on the surface of a molded article, they disappear because the resin which contacts the surface of the metal mold has not solidified yet and transforms as described above.

Expressing the difference in the gloss of the molded article per unit length along the line from the gate end to the dead end of the mold as "gloss gradient", this gradient is very low and amounts to 0-0.5, preferably the 0-0.2 and most preferably to 0-0.1%/cm for injection molded articles according to the present invention. In contrast thereto, the gloss gradient lay in most cases in the range from 1 to 5%/cm, for the conventional injection molded articles having a ratio of resin flow length L to the thickness t of the molded article L/t=20-30 or more. This shows the remarkable excellency of the molded articles according to the present invention in their gloss and gloss irregularity.

While, by the method according to the present invention, it is possible to obtain injection molded articles exhibiting superior surface gloss from thermoplastic resin mixtures containing 4% by weight or more of reinforcing materials and/or fillers, the method according to the present invention brings about injection molded articles showing no such surface defects, as silver streak, jetting, weld line etc., the same is true when resin mixture containing less than 4% by weight of reinforcing materials and/or fillers or individual resin is used.

As for the thermoplastic resin capable of being employed in the present invention, those based on styrene and on polyphenyleneether are to be recited as typical examples therefor.

By the resins based on styrene are meant all the resins containing styrene as predominant monomer component together with other subsidiary comonomer components and/or reinforcing component. Concretely, the followings may be enumerated:

Polystyrene, styrene/acrylonitrile resin (SAN resin) acrylonitrile/styrene resin (AS resin), rubber reinforced styrene base resins such as high impact polystyrene (HIPS) and medium impact polystyrene (MIPS), butyl acrylate rubber/acrylonitrile/styrene copolymer (AAS), ethylene-propylene rubber/acrylonitrile/styrene copolymer (AES), ABS resins including acrylonitrile/butadiene/styrene copolymer, acrylonitrile/butadiene/styrene/α-methyl styrene copolymer and acrylonitrile/methyl methacrylate/butadiene/styrene copolymer, and so on.

Among these resins based on styrene, those which show marked effect according to the present invention are the afore-mentioned rubber reinforced styrene base resins. These resins tend to offer rough surface upon injection molding, due to the large rubber particles contained, which are subjected to deformation upon movement inside the metal mold. Therefore, according to the conventional practice of injection molding, only gloss values around 60% are reached by rubber reinforced styrene base resins containing 4% by weight or more of the rubber component. In contrast thereto, it is possible according to the method of the present invention, to attain gloss values of about 90–100% by the same resins. By employing ABS resins, it is possible, according to the present invention, to obtain higher gloss values which are usually above 94%.

The resins based on polyphenyleneether (PPE) to be used according to the present invention are those containing as the principal component (more than 80%) a polyphenyleneether expressed by the general formula

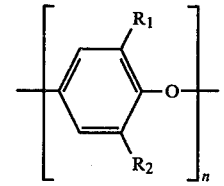

wherein $R_1$ and $R_2$ denote each an alkyl group having 1-4 carbon atoms and n represents the polymerisation degree, a polyphenyleneether graft-copolymerised with styrenic compound or a resin mixture consisting of 20-80% by weight of one of these polyphenyleneethers and 80-20% by weight of a polymer based on styrene.

The thermoplastic resin composition to be used according to the present invention can contain other additives which are commonly employed in the art, such as, flame resisting agent, lubricating agent and so on.

Examples of the polyphenyleneethers expressed by the above general formula are: poly(2,6-dimethylphenylene-1,4-ether), poly(2,6-diethylphenylene-1,4-ether), poly(2-methyl-6-ethylphenylene-1,4-ether), poly(2-methyl-6-propylphenylene-1,4-ether), poly(2-ethyl-6-propylphenylene-1,4-ether), poly(2-methyl-6-butylphenylene-1,4-ether), poly(2-ethyl-6-butylphenylene-1,4-ether) and so on.

The styrenic compound in the polyphenyleneether having graft-copolymerised a styrenic compound as mentioned above includes styrene and its derivatives such as alkylated styrene, halogenated styrene and so on. Example therefor are: styrene, α-methyl-styrene, 2,4-dimethyl-styrene, monochlorostyrene, dichlorostyrene, p-methyl-styrene, ethyl-styrene and so on.

It is possible to use concurrently upon the polymerisation another copolymerisable vinyl compound such as, methyl methacrylate, acrylonitrile, methacrylonitrile, butyl acrylate and so on. It is also possible to graft two or more styrenic compounds concurrently.

The constituent components of the polymer based on styrene as previously stated may be the same with the above compounds to be used concurrently upon the graft copolymerisation.

The polymer based on styrene includes, according to the present invention, also the so-called rubber reinforced resins, such as rubber reinforced polystyrene, acrylonitrile/butadiene/styrene copolymer resin and polystyrene resin containing EPDM rubber.

When polyphenyleneether resins as identified above are used, the injection molded articles obtained according to the present invention will exhibit, in general, surface gloss value of more than 80%.

It is of course possible to use other injection molding resins such as polyethylene, polypropylene, polycarbonate, polyoxymethylene, nylon and so on.

The filler to be incorporated in the thermoplastic resin composition according to the present invention includes those of inorganic nature, for example glass fiber, glass beads, calcium carbonate, mica, asbestos, and so on and powder and hollow material of metals such as iron, copper, zinc and aluminum, as well as oxides and hydroxides of these metals, each having a predominant particle size of 5-mesh or below.

The total amount of filler in the resin composition according to the present invention falls in general within a range of from 5 to 70% by weight, based on the total composition.

The high-frequency oscillator which can be employed according to the present invention may be of electromotive generator, electron tube or thyristor inverter types. A frequency in the range from 50 Hz to 10 MHz can be used, while a frequency of from 1 to 1000 KHz may be recommended in practice. The power output of the high-frequency oscillator may be in the range from 1 to 5000 KW, to be determined suitably in accordance with the size of metal mold to be heated, the temperature contemplated and the rate of temperature elevation intended.

Here, the heating power P through a high-frequency induction heating is calculated by the equation.

$$P = \frac{8\pi^5 a^4 f^2 \mu_s^2 n^2 I^2}{\rho} \times 10^{14}$$

in which P is the heating power, a is the radius of the induction coil, f is the frequency, $\mu_s$ denotes the specific magnetic permeability, n indicates the number of coil windings per meter, I represents the electric current in the coil and $\rho$ is the specific resistance of mold metal.

For instance, a pertinent power output of an oscillator, in which the inductor is made from copper tube of 5 mm diameter by winding it at an interval of 5 mm into a swirl and the distance between the inner surface of the metal mold and the inductor set at 1 cm, lies within a range from 0.1 to 10 KW per 1 cm² of the surface area of molded article, on condition that the frequency used is 400 KHz and the temperature of the metal mold of S 45 C is elevated by 40°-50° C. from the starting temperature of about 40°-90° C. within a heating time of 10-15 seconds, as in the ordinary injection molding. At power outputs less than 0.1 KW/cm², the rate of temperature elevation of the metal mold is too low to be practical and eventually may suffer from overload, causing the overload breaker to actuate and the heating to cease.

When the power output exceeds over 10 KW/cm², the rate of temperature elevation becomes too steep to control the mold temperature and, in case of large metal mold with greater heating surface, a uniform heating becomes no longer possible. If there is a temperature inequality of more than 50° C. over the inner surface of the metal mold, gloss irregularities, sink marks and so on over the surface of the injection molded article will tend to occur.

Hereinbelow, the invention is further explained in detail by reciting Examples, which however should offer no restriction on the scope of the present invention.

EXAMPLE 1

A SAN resin composition containing 20% by weight of glass fiber having a diameter of 13μ was injection molded by an injection molding machine of ordinary in-line type shown in FIG. 1. The split mold made of an ordinary steel of S 45C was used and provided for molding a dish-like article having a diameter of 10 cm, a depth of 2 cm and average wall thickness of 3.5 mm. The mold is equipped with a centerdirect gate.

An inductor was prepared in such a manner that a copper tube having a diameter of 3 mm was embedded in an epoxy resin at an interval of 5 mm into a whirl and the resin was then shaped to fit the profile of the mold cavity to be solidified.

The temperature of the injection cylinder was adjusted so as to obtain a resin mixture temperature of 240° C. Before injecting the resin mixture into the mold, the inductor prepared as above was put between the two mold halves. After actuating the oscillation at 400 KHz, 6 KW, for 15 seconds, the split mold was once opened to draw out the inductor before it was closed again. During this procedure, the cooling water was made not to circulate in the mold metal. Then, the molten AS resin composition containing glass fiber was injected into the mold at an injection pressure of 60 Kg/cm² for 10 seconds, as in ordinary injection molding. Thereafter, cooling water was circulated in the mold metal for 20 seconds to cool the molded article. Then, the molded article was taken out of the mold. The molding cycle amounted to 60 seconds in total.

The appearance of the molded article was excellent and was comparable to that of molded article of AS resin only and showed no fault such as silver streak and exposure of glass fiber on the outer face. Gs(60°)% of the molded article was excellently high as much as 102%.

EXAMPLE 2

An ABS resin composition containing 20% by weight of glass fiber of a diameter of 15μ was molded by an ordinary type injection machine at a resin temperature of 240° C. The split mold employed was made of S55C steel and was so constructed that a dumnbell specimen having a shape prescribed in JIS K 6871 and a rectangular plate specimen can be molded. Inductor was prepared by winding a copper pipe with diameter of 3 mm into whirl at an interval of 5 mm and embedding it in an epoxy resin plate of thickness of 2 cm. The procedure of injection molding was the same as in Example 1, but with 400 KHz, 6 KW, 10 seconds of high-frequency oscillation, 10 seconds of injection molding duration, 15 seconds of water cooling, 50 seconds of total cycle time and 50 Kg/cm² of injection pressure.

The surface of the so molded article was covered by a skin layer of the ABS resin employed. A molded article exhibiting beautiful appearance and superior gloss was obtained.

The molded article was evaluated for its properties according to the instruction of JIS K 6871. The results were as given in Table 1.

As is seen from Table 1, the molded article obtained revealed an excellent appearance, superior gloss and other favorable properties.

EXAMPLE 3

A polystyrene composition containint 50% by weight of 200-mesh iron powder was molded by an ordinary in-line type injection machine at a resin temperature of 220° C. The split mold having an edge gate was so constructed, that a pair of flat rectangular dishes of 5 cm×8 cm×0.5 cm, which can be coupled together to form a case having hinge, are molded simultaneously.

Inductor was prepared by winding a copper tube having a diameter of 5 mm into whirl at an interval of 5 mm and embedding it in an epoxy resin plate of 2 cm thickness.

This inductor was placed between the two mold halves. The inductor was actuated by 400 KHz, 6 KW for 15 seconds. After the inductor was withdrawn from the mold, the injection molding was carried out as in Example 1.

The surface of the thus molded article was the same as that of ordinary molded product of PS resin without additives, showing no exposure of iron powder on the outer face. The specific gravity of the molded article was found to be 1.8, exhibiting a solid touch heretofore unseen in conventional PS molded product. GS (60°)% of the molded article was 99%.

COMPARISON EXAMPLE 1

Using the same injection molding machine, same mold and same resin composition as in Example 2, injection molding was carried out under the condition of resin temperature of 240° C., mold temperature of 60° C., injection duration of 10 seconds, cooling time of 15 seconds, total injection cycle of 40 seconds and injection pressure of 50 Kg/cm² without preheating by high-frequency induction. The properties of the so obtained molded article were as given in Table 1.

TABLE 1

Comparison of Injection Molding with and without High-Frequency Induction Preheating

| Property | Method of Examination | Unit | Example 2 | Comparison Example 1 |
|---|---|---|---|---|
| Tensile strength | JIS K 6871 | Kg/cm² | 1000 | 1000 |
| Elongation | JIS K 6871 | % | 2 | 2 |
| Flexural modulus | ASTM D 790 | Kg/cm² | 55000 | 55000 |
| Flexural strength | ASTM D 790 | Kg/cm² | 1300 | 1300 |
| Izod impact strength (3.2 mm thick, without notch) | JIS K 6871 | Kg-cm/cm | 30 | 25 |
| Heat distortion temp. | JIS K 6871 | °C. | 104 | 100 |
| Gloss | ASTM D 523 | Gs (60°)% | 98 | 45 |

EXAMPLE 4

It was intended here to make comparison of surface gloss values of molded articles at various mold temperatures for various resins employed.

Figure 7:
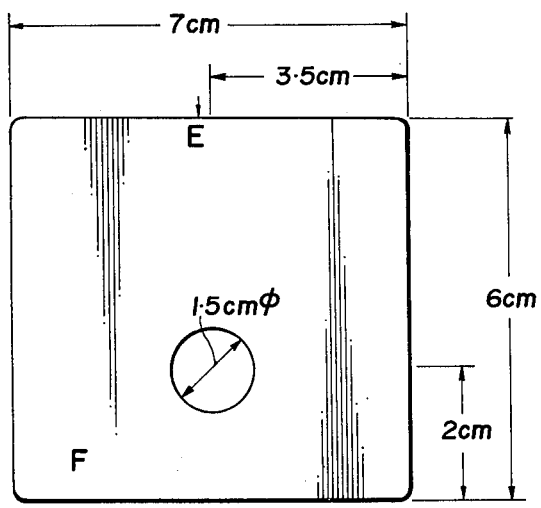
FIG. 7 illustrates the size and shape of the specimen used in Examples.

A sprit mold made of ultra hard mold metal (NAK metal) with mirror finished mold inner surface for molding a flat square piece with a perforation of 1.5 cm φ and having a thickness of 3 mm, as shown in FIG. 7, was used, the gate of which was positioned at E in FIG. 7 and was a restrict gate of $4^W \times 8^L \times 2^t$ mm. Inductor was prepared by winding a copper tube having a diameter of 5 mm into a flat whirl at an interval of 10 mm and embedding it in an epoxy resin plate of a thickness of 3 cm. The high-frequency oscillator with continuous variable output power was used at 7 KHz, 10 KW. For the injection molding machine, Toshiba IS 80 (5 oz injection molding machine) was employed. The injection molding was carried out by the temporarily adopted inductor in accordance with the present invention under ordinary condition using various resin composition. The results were as given in Table 2.

It is seen in Table 2, that injection molded articles having high gloss and showing almost no gloss gradient, namely "uniformity of high gloss", can be obtained according to the present invention. In other words, it is seen, that there is considerable difference in the surface gloss between the portions E and F for conventional product, whereas there is no such difference for the product according to the present invention in addition to the high gloss thereof.

TABLE 2

| | | Injection molding at | | Conventional product | | | Product according to the invention | | |
|---|---|---|---|---|---|---|---|---|---|
| | | Cylinder temp. (°C.) | Injection press. (Kg/cm²)* | Max. temp. of mold inner surface (°C.) | GS(60°)% portion E | GS(60°)% portion F | Max. temp. of mold inner surface | GS(60°)% portion E | GS(60°)% portion F |
| Trade name | Resin | | | | | | | | |
| Styron 492 | HIPS | 220 | 35 | 70 | 41 | 32 | 110 | 103 | 103 |
| Styron 492 | HIPS | 220 | 50 | 60 | 30 | 25 | 110 | 103 | 103 |
| Styron 492 | HIPS | 220 | 40 | 40 | 20 | 18 | 110 | 103 | 103 |
| Styron XH 602 | HIPS | 220 | 35 | 70 | 51 | 40 | 110 | 102 | 102 |
| Styron 777 (492-50/683-50) | MIPS | 220 | 30 | 70 | 60 | 55 | 110 | 102 | 102 |
| Styron 777 (XH 602-30 /679-70) | MIPS | 220 | 30 | 70 | 85 | 85 | 110 | 102 | 101 |
| Stylac 100 | ABS | 230 | 40 | 70 | 70 | 63 | 110 | 100 | 99 |
| Stylac 120 | ABS | 230 | 40 | 70 | 89 | 86 | 110 | 100 | 100 |
| Tyril GF | Glass Fiber | 240 | 45 | 70 | 40 | 39 | 115 | 102 | 101 |

TABLE 2-continued

| | | Injection molding at | | Conventional product Max. | | | Product according to the invention | | |
|---|---|---|---|---|---|---|---|---|---|
| | | Cylinder temp. (°C.) | Injection press. (Kg/cm²)* | temp. of mold inner surface (°C.) | GS(60°)% portion E | GS(60°)% portion F | Max. temp. of mold inner surface | GS(60°)% portion E | GS(60°)% portion F |
| Trade name | Resin | | | | | | | | |
| R 140 T | Reinforced SAN GF content 20 wt. % | | | | | | | | |
| Stylac GF R 240 A | Glass Fiber Reinforced ABS, GF content 20 wt. % | 240 | 45 | 70 | 35 | 30 | 115 | 99 | 98 |
| Stylac GF R 220 A | Glass Fiber Reinforced ABS, GF content 10 wt. % | 240 | 40 | 70 | 45 | 43 | 115 | 99 | 99 |
| Xyron GF G 702 H | Glass Fiber Reinforced PPE, GF content 20 wt. % | 290 | 45 | 90 | 30 | 28 | 135 | 102 | 102 |
| Stylac A 4081 | AB S 60 wt. % Fe₂O₃ 40 wt. % | 240 | 40 | 70 | 50 | 45 | 120 | 100 | 100 |
| Xyron 201 V | PPE | 240 | 45 | 80 | 50 | 45 | 130 | 103 | 103 |
| Xyron 500 H | PPE | 290 | 45 | 90 | 45 | 40 | 135 | 103 | 102 |
| HIPS trial product | Rubber content 5 wt. % | 220 | 35 | 70 | 45 | 33 | 110 | 103 | 103 |
| HIPS trial product | Rubber content 10 wt. % | 220 | 37 | 70 | 35 | 21 | 110 | 102 | 102 |
| HIPS trial product | Rubber content 15 wt. % | 220 | 41 | 70 | 20 | 13 | 110 | 101 | 100 |
| Loymer S 3340 | CaCO₃ 40 wt. % fillered pp | 220 | 50 | 40 | 16 | 17 | 150 | 88 | 88 |
| Panlite G 1030 | Glass Fiber Reinforced PC, GF cont. 30 wt. % | 290 | 90 | 80 | 25 | 20 | 160 | 103 | 103 |
| Amilan CM 10116-30 | Glass Fiber Reinforced PA-6, GF cont. 30 wt. % | 240 | 50 | 80 | 30 | 25 | 205 | 94 | 94 |

*determined based on the norm "short shot point + 5" Kg/cm²
GF = glass-fiber
PC = Polycarbonate
PA = Polyamide In the molded articles according to the present invention, the faulty surface defects of flow marks, jettings and silver streaks are completely avoided and also the weld line is not noticeable for all rsins examined.

In the molded products by the conventional practice, a high gloss product is never obtained even by selecting the resin employed, as can be seen from Table 2. Flow marks and jettings were found, silver streaks occurred in molded product containing filler and weld line was noticeable. Improvements in the appearance and gloss obtained by alteration of the molding condition, especially of the mold temperature is limited and does not reach the level according to the present invention.

COMPARISON EXAMPLE 2

It is contemplated to exemplify the preheating of the metal mold by introducing a heated fluid into the mold.

The metal mold of Example 4 was used. As the heating fluid, steam of 10 Kg/cm² was employed. The metal mold was provided with inlet and outlet slits where molten resin cannot flow into but steam at parting planes in such a manner that an inner surface of the mold could be heated. In the inlet, a check valve was arranged and a trap was installed at the outlet. In order to allow to maintain the steam pressure within the metal mold, O-rings were employed. It was so difficult to seal up the mold against the steam of 10 Kg/cm², that practical industrial application of such technique would be impossible, since the metal mold has a kick out pin and O-ring is not much effective for sealing. The preheating of the metal mold was performed with the steam leaking. The steam pressure within the mold was kept at 3–4 Kg/cm² for 30 seconds, before it was discharged. The injection molding was carried out subsequently. The mold temperature at this moment was 120° C. The so obtained molded product was not always fine. Occasionally, speckles on the molded product were recognized, though the reason therefor was not identified whether it had been caused from the water rest or the corrosion inhibitir contained in steam. There was also rest around an injector pin on the molded product, said rest being likely due to mold sweat.

Moreover, a labor safety problem, maintenance of metal mold for, such as, corrosion prevention etc., problem of durability of O-ring and so on add thereto, wherefrom it may be concluded that this procedure is far less applicable in industry as compared with the present invention.

EXAMPLE 5

The procedures of Example 1 were followed with the exception that instead of the 20% GF-containing SAN resin, a PP resin containing 30% by weight of glass fiber was employed. Results comparable to the SAN resin were obtained. Gs(60°)% of the molded article was 88%.

EXAMPLE 6

Using a split metal mold, for molding a pair of casing halves for audio cassettes (called cassette halves), and HIPS resin composition was injection molded.

The inductor was prepared by winding a copper pipe with diameter of 5 mm into flat whirl at an interval of 5 mm and embedding it in an epoxy resin plate of a thickness of 3 cm. This inductor was placed between the mold halves and energized by a high frequency output of 7 KHz, 20 KW for 15 seconds. After it was withdrawn from the mold, the injection molding was carried out as in Example 1.

The molded article exhibited a complicated configuration having ribs, bosses, perforations and embossed pattern which might have exhibited flow marks, weld lines and the like if molded by the conventional injection molding technique. The molded article showed however, a superior appearance with no flow mark and no visible weld line but improved feeling of the embossed pattern. The dimensional accuracy was the same as that of injection molded article of prior art. No distortion was recognized.

By examining the gloss at a flat portion of the molded article, the Gs(60°)% values for the article according to the invention and for the article of conventional method were found to be 98% and 45% respectively.

EXAMPLE 7

The split metal mold employed was the one shown in FIG. 4, in which the parts A and A′ were made of a NAK metal and the surfaces thereof contacting the injected resin composition were mirror finished. This mold has a center direct gate and produces a molded article of dish-like configuration having a diameter of 10 cm, a depth of 2 cm and an average thickness of 3.5 mm. The inductors at the portions B and B′ were prepared each by winding a copper pipe of a diameter of 5 mm into flat whirl of an interval of 15 mm and embedding it in an epoxy resin plate of a thickness of 15 mm. The mold parts C and C′ are made of bronze plate having a thickness of 3 mm. The mold parts D and D′ are made of mold steel S-45C.

Using this split mold, a commercially available SAN resin composition containing 20% by weight of glass fiber was injection molded. The injection cylinder temperature was adjusted so that the temperature of the resin composition was held at 240° C. The inductors were energized by a high-frequency oscillator of 4 KHz, 8 KW, for 10 seconds. Subsequently, the injection molding was carried out at an injection pressure of 60 Kg/cm$^2$ in an injection period of 10 seconds as in a conventional manner. Then the mold was cooled for 20 seconds before the molded article was withdrawn. The total molding cycle was 45 seconds.

The so obtained molded article showed the same appearance as that of the molded article made of exclusively SAN resin. No silver streak nor the projection of glass fiber outside the surface of the molded article was able to recognize. The gloss Gs(60°)% was 102%.

COMPARISON EXAMPLE 3

For the sake of comparison, an injection molding was conducted in the same condition but without employing said high-frequency induction heating prior to the injection, which resulted in a product with discolored appearance showing many silver streaks and having a Gs(60°) value of 45%.

EXAMPLE 8

The apparatus and the procedures were the same as in Example 7, except that the resin employed was changed to HIPS, ABS and PPE and the molding temperature was varied so as to match each resin. The molded article of each resin had excellent appearance overturning the generally accepted evaluation of the injection molded articles. Thus, all the molded articles obtained exhibited gloss values Gs(60°)% exceeding above 100% regardless of the position on the article and showed no gloss irregularities, faulty jettings or so on.

In Table 3, the conditions of injection molding appearance and gloss of the molded article for each individual resin composition are recited together with those of comparison Example 4 in which the procedures of Example 7 were followed except that the preliminary heating of metal mold by high-frequency induction was discarded.

TABLE 3

| | | | Example 8 | | | Comparison Example 4 | |
|---|---|---|---|---|---|---|---|
| Resin | Resin temp. (°C.) | Oscillation duration (sec.) | Total molding cycle (sec.) | Appearance of product | Gs(60°)% | Total molding cycle (sec.) | Appearance of product | Gs(60°)% |
| HIPS | 220 | 10 | 45 | No gloss irregularity | 104 | 35 | Gloss irregularity occur | 60–70 |
| ABS | 240 | 10 | 45 | No gloss irregularity | 104 | 35 | Gloss irregularity occur | 85–90 |
| PPE | 280 | 15 | 50 | No gloss irregularity | 103 | 40 | Gloss irregularity occur | 35–45 |
| SAN-GF (Example 7) | 240 | 10 | 45 | No gloss irregularity | 102 | 35 | Gloss irregularity occur (rough surface) | 45–60 |

We claim:

1. Injection molded articles of thermoplastic resin compositions containing at least one of reinforcing materials and fillers in an amount at least 4% by weight, and comprising a smooth skin layer constituted substantially of only the resin component over the outer surface of the molded article, said layer bestowing on the molded article a mirror surface having surface gloss (ASTM D 523; 60°) well maintained within a decrement of reflectivity of 10% or less, based on the ideal perfect mirror reflection of the intrinsic resin employed.

2. Injection molded articles according to claim 1, wherein the thermoplastic resin compositions are high impact polystyrene resin or ABS resin.

3. Injection molded articles according to claim 2, wherein the decrement of reflectivity is 5% or smaller.

4. Injection molded articles according to claim 1, wherein the thermoplastic resin compositions are glass fiber-reinforced resins.

5. Injection molded articles according to claim 1, wherein the thermoplastic resins are resins based on styrene.

6. Injection molded articles according to claim 1, wherein the thermoplastic resin compositions are polyphenylene resins reinforced by styrene/butadiene copolymer.

* * * * *